(12) United States Patent
Bewersdorf et al.

(10) Patent No.: US 6,798,569 B2
(45) Date of Patent: Sep. 28, 2004

(54) MICROSCOPE AND METHOD FOR OPERATING A MICROSCOPE

(75) Inventors: Joerg Bewersdorf, Heidelberg (DE); Hilmar Gugel, Dossenheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 78 days.

(21) Appl. No.: 10/037,851

(22) Filed: Jan. 4, 2002

(65) Prior Publication Data

US 2002/0105723 A1 Aug. 8, 2002

(30) Foreign Application Priority Data

Jan. 5, 2001 (DE) .......................................... 101 00 246

(51) Int. Cl.[7] .............................................. G02B 21/00
(52) U.S. Cl. ...................................... 359/368; 359/391
(58) Field of Search ................................ 359/368, 372, 359/373, 383, 391, 392, 395, 396, 397; 250/214 DC (56) References Cited

U.S. PATENT DOCUMENTS

| | | | |
|---|---|---|---|
| 4,998,284 A | | 3/1991 | Bacus et al. .................... 362/6 |
| 5,581,831 A | | 12/1996 | Ortya et al. ................. 382/128 |
| 5,663,057 A | * | 9/1997 | Drocourt et al. ............ 435/40.5 |
| 5,771,094 A | * | 6/1998 | Carter et al. ................. 356/326 |
| 5,788,853 A | * | 8/1998 | Zenhausern .................... 216/2 |
| 6,388,809 B1 | * | 5/2002 | MacAulay ................... 359/383 |
| 8,424,421 | | 7/2002 | Cremer et al. .............. 358/620 |

FOREIGN PATENT DOCUMENTS

| | | |
|---|---|---|
| EP | 0491289 | 6/1992 |
| EP | 1113304 | 7/2001 |
| EP | 1162450 | 12/2001 |
| GB | 2273994 | 7/1994 |
| WO | 9828592 | 7/1998 |

OTHER PUBLICATIONS

In J.B. Pawley "Handbook of biological confocal Microscopy", 1995, Denk et al. "Two–photon molecular excitation in laser–scanning microscopy" 1995, pp.445 to 448.

* cited by examiner

Primary Examiner—Mark A. Robinson
(74) Attorney, Agent, or Firm—Davidson, Davidson & Kappel, LLC (57) ABSTRACT

The present invention concerns a microscope, in particular a confocal or double confocal scanning microscope, as well as a method for operating a microscope, at least one specimen support unit associated with the specimen being provided, at least one reference specimen of known configuration being provided, and the reference specimen being detectable by light microscopy for calibration, alignment or adjustment of the microscope. With the microscope according to the present invention and the method according to the invention for operating a microscope, drift-related changes can be detected and compensated for. Auxiliary means with which a specimen can easily and reliably be focused are also provided.

20 Claims, 8 Drawing Sheets

MICROSCOPE AND METHOD FOR OPERATING A MICROSCOPE

CROSS REFERENCE TO RELATED APPLICATIONS

This invention claims priority of the German patent application 101 00 246.7 which is incorporated by reference herein.

FIELD OF THE INVENTION

The present invention concerns a microscope, in particular a confocal or double confocal scanning microscope, as well as a method for operating a microscope.

BACKGROUND OF THE INVENTION

Microscopes, in particular confocal scanning microscopes, have been known for some time from practical use. The reader is referred to J. B. Pawley, ed., "Handbook of Biological Confocal Microscopy," Plenum Press 1995, 2nd edition, regarding confocal scanning microscopes; and to EP 0 491 289 A1 regarding double confocal microscopes.

The microscopes of the generic type are used in particular for images of biomedical specimens, where specimen detections may definitely require a longer period of time. In confocal and especially in double confocal scanning microscopes, however, the individual components of the microscope and the specimen are subject to temperature-related drifts relative to the objective, so that specimen detections lasting for a longer period of time may thereby be erroneous.

In confocal and double confocal scanning microscopes in particular, the focusing of a new sample after the new sample has been put in place is time-consuming, and requires a high level of skill on the part of the user. This is the case in particular when it is not known whether the sample will be visible at all, for example because a new fluorescent preparation method is being tested. Finding the specimen and positioning it in the focal plane of the microscope objective can thus be difficult if not in fact impossible. Especially when a new fluorescent preparation method is being tested, a specimen with a weak fluorescent marking may already have bleached out before the specimen is located in the focal plane of the microscope objective, since during the search procedure the specimen region is continuously impinged upon by light suitable for exciting the fluorescent markers.

SUMMARY OF THE INVENTION

It is therefore the object of the present invention to describe and further develop a microscope, in particular a confocal or double confocal scanning microscope, and a method for operating a microscope, in which drift-related changes can be detected and compensated for, and auxiliary means are provided with which a specimen can be easily and reliably focused.

The above object is achieved by a microscope comprising:
at least one specimen support unit associated with a specimen, and
at least one reference specimen of known configuration, wherein the reference specimen being detectable by light microscopy for calibration, alignment, and adjustment of the microscope.

According to the latter, the microscope according to the present invention is in particular a confocal or double confocal scanning microscope, at least one specimen support unit associated with the specimen being provided, at least one reference specimen of known configuration being provided, and the reference specimen being detectable by light microscopy for calibration, alignment, and/or adjustment of the microscope.

What has been recognized according to the present invention is firstly that the drift motions of various components of the microscope or the specimen relative to the objective, related principally to temperature, cannot be prevented with acceptable outlay, for example by means of corresponding temperature regulation of the relevant microscope components. If, however, at least one reference specimen of known configuration is provided, on the basis of which conclusions as to drift motions can be drawn, the drift can thereby be compensated for by means of corresponding alignment actions. For that purpose, the reference specimen must be of known configuration, i.e. the size, shape, structure, and/or optical properties of the reference specimen are known. In addition, the reference specimen must be detectable by light microscopy, which necessarily makes necessary an operation for detecting the reference specimen. According to the present invention, the microscope can be realigned by light-microscopy detection of the reference specimen of known configuration.

In particular, a specimen in a confocal or double confocal scanning microscope can be easily located and focused if, for example, a partially mirror-coated cover glass is used as the reference specimen, and if the specimen together with the specimen support unit and cover glass is moved along the optical axis of the microscope objective, the reference specimen being continuously searched for during the movement. This detection operation could, for example, be accomplished with light of a wavelength that is not suitable for exciting the fluorescent markers to fluoresce, so that bleaching of the fluorescent markers during the focusing operation can be avoided. As soon as the reference specimen configured as a partially mirror-coated cover glass is detected, a corresponding fluorescence detection of the fluorescent markers of the specimen, and thus the actual specimen measurement, can follow. It is thus possible, in particularly advantageous fashion, to automate recurring steps for adjustment of the microscope—for example, the focusing of different specimens—so that the overall operation of the microscope is simplified.

In addition, according to the present invention a double confocal scanning microscope can be calibrated by the use of a reference specimen. For example, the focus of the one microscope objective could be oriented exactly onto the focus of the other microscope objective by detecting a single confocal microscope image of the reference specimen using only one objective of the one beam path segment. The same reference specimen is then detected using only the second microscope objective of the second beam path segment. A comparison of the two images of the same reference specimen makes possible lateral and/or axial orientation of the two microscope objectives relative to one another, so that on the one hand the focal planes of the two microscope objectives laterally and/or axially overlie one another, and on the other hand their optical axes coincide. According to the present invention it is thus possible to calibrate the microscope, in particular a double confocal scanning microscope, even (if applicable, automatically) directly before a specimen detection operation that is to be performed, so that advantageously a user of the microscope does not need to perform a calibration.

In a concrete embodiment, the specimen support unit is fabricated from glass. In the simplest embodiment, the specimen support unit could be a conventional specimen slide or a conventional cover glass. Especially in confocal or double confocal scanning microscopy, the glass of the specimen slide or the cover glass has a refractive index that is suitable or adapted for the use of the respective microscope objective.

In a preferred embodiment, a glass plate that can be affixed onto the specimen support unit has at least one planar area configured as a reference specimen. In particular, the glass plate that can be affixed onto the specimen support unit is a cover glass. A correspondingly configured planar area of the glass plate or of the cover glass thus forms the actual reference specimen. Alternatively or additionally, the specimen support unit could thereby comprise at least one planar area configured as the reference specimen.

The planar area in turn possesses a texture and/or a structure. Said texture/structure could comprise a regular or irregular lattice that, for example, is made up of individual lines. Regular or irregular polygons or curves are also conceivable.

Alternatively or in addition thereto, the planar area could possess a coating and/or a holographic impression. With regard to a concrete embodiment, the texture of a planar area could be produced by means of a corresponding coating, for example using photolithographic exposure methods.

Provision is made for the coating to be of reflective and/or luminescent configuration, so that detection of the reference specimen by light microscopy is possible. The reflection coefficient of the coating is usually substantially less than 1, so that the coating only partially reflects the light that strikes it. A coating that comprises fluorescent or phosphorescent molecules could be provided as the luminescent coating. A coating of this kind could be applied, for example, using methods that are similar to those of inkjet printing. In particular, the luminescent coating could be configured in such a way that it can be excited only with light of a wavelength that is not suitable or provided for the actual specimen detection. In a reference measurement, the specimen is thus not impinged upon by light that, for example, causes specific fluorescent markers to bleach out.

In a particularly preferred embodiment, provision is made for the texture or structure of the planar area to be of asymmetrical configuration. For example, the texture/structure could be assembled from irregular geometric shapes that comprise lines, curves, elliptical segments, or circle segments. An asymmetrical texture/structure makes possible, after a detection of the reference specimen, an unequivocal allocation of the detected region of the reference specimen to a corresponding specimen region already previously detected in conjunction with the reference specimen, so that, in particular, any drift of the specimen relative to the microscope can thereby be detected and correspondingly compensated for.

In a very particularly preferred embodiment, the planar area configured as the reference specimen is arranged in one plane. This could be a surface of the specimen support unit or a surface of the glass plate that can be affixed onto the specimen support unit. The reflective or luminescent coating could correspondingly be applied onto said surface. Ideally, the planar area of the specimen support unit or of the glass plate that can be affixed onto the specimen support unit is oriented in such a way that it is oriented parallel to the focal plane of the microscope objective. Any tilting of the specimen support unit relative to the focal plane of the microscope objective, especially in the context of a double confocal scanning microscope, could thereby be detected and correspondingly corrected by means of suitable positioning elements.

In a further embodiment, provision is made for a microscopic specimen that can be affixed onto the specimen support unit to serve as the reference specimen. Beads or nano crystals, for example, could serve as microscopic specimens; the beads or nano crystals could be provided with identical or differing sizes and optical properties. Provision is made in particular for the microscopic specimens serving as reference specimens to be stochastically distributed. A stochastic distribution of said specimens could be achieved, for example, by dripping a solution containing the microscopic specimens onto the specimen support unit; the solution could be removed, for example, by evaporation. With such a procedure, initially the reference specimen is known only in terms of its configuration, i.e. beads with a diameter of, for example, 300 nanometers are used. The arrangement/distribution of multiple beads—for example on the specimen support unit—is, however, stochastic in nature and not initially known. An operation of detecting the reference specimens would therefore need to be performed so that their structure or arrangement/distribution on the specimen support unit is also known.

In terms of method, the aforementioned object is achieved by means of the features of claim 13. According to the latter, the method according to the present invention is a method for operating a microscope, in particular a confocal or double confocal scanning microscope, at least one specimen support unit being associated with the specimen, and at least one reference specimen of known configuration being detected by light microscopy for calibration, alignment, and/or adjustment of the microscope.

What has been recognized according to the present invention is therefore that it is simpler and, above all, more economical to use the method according to the present invention for calibration, alignment, and/or adjustment of the microscope than to utilize methods which regulate the microscope, or at least essential components thereof, to a specific temperature so that drifts of the individual components can thereby largely be suppressed. In the latter case, the object underlying the invention would not be entirely achieved in terms of a calibration or adjustment of the microscope.

In the case of the method according to the present invention, provision is preferably made for the reference specimen to be detected by an image acquisition. A conventional microscope having a CCD camera as detector could be used here, for example. If the microscope is a confocal or double confocal scanning microscope, provision is made for the detection operation to be a scanning operation. Said scanning operation is accomplished, in particularly advantageous fashion, in the form of a two-dimensional optical section. This ensures rapid detection of the reference specimen, since because of the particular configuration of the reference specimen, acquisition of three-dimensional data from the reference specimen is not necessary. It is of essential significance that an almost unequivocal identification of the reference specimen is already possible in only one acquired image, since the reference specimen is of known configuration. Conclusions can thereby be drawn as to the position and orientation of the reference specimen, ideally with only a single two-dimensional image acquisition or a single two-dimensional scanning operation. Preferably the two-dimensional optical section is oriented in such a way that it is perpendicular to the planar area configured as the reference specimen. If the planar area serving as the reference specimen is, for example, arranged parallel to the focal plane of the microscope objective, a two-dimensional optical section for imaging the reference specimen could be oriented in such a way that the optical section lies in a plane that contains the optical axis.

In particularly advantageous fashion, the image data of the reference specimen are evaluated in computer-assisted fashion. This image data evaluation could be accomplished, for example, using digital image processing methods. For example, conclusions could be drawn on the basis of the detected image data of the reference specimen as to its position and/or orientation relative to the detected specimen region. Information about a possible drift of the specimen relative to the specimen support unit or relative to the reference specimen can thereby be obtained.

It is furthermore conceivable that by comparing detected image data of the reference specimen to previously detected image data, for example of the reference specimen, conclusions can be drawn as to the drift of the specimen or of the specimen support unit. With this procedure, a drift of the entire specimen support unit (i.e. of the specimen support unit together with the specimen and optionally cover glass) relative to the microscope objective can be detected, whereas in the previous case it is principally a drift of the specimen relative to the specimen support unit that is detectable.

In a concrete method step, provision is made for a drift of the specimen and/or of the specimen support unit to be compensated for by a corresponding motion of the specimen support unit. The specimen or specimen support unit that has moved, for example, 2 $\mu$m in one direction because of a drift is thus moved back the same amount in the opposite direction, so that the original state is restored. Alternatively or in addition thereto, provision is made for the drift of the specimen to be compensated for using methods of digital image processing. In this context, the compensation takes place only in computer-assisted fashion; i.e. in accordance with the above example, the image data of the specimen are displaced by an amount corresponding to the linear magnification of the microscope optical system. This procedure is therefore accomplished only in computer-assisted fashion, and is applied to the detected image data of the specimen.

In a particularly preferred method step provision is made, for a double confocal scanning microscope, that on the basis of the detection of the reference specimen, the optical beam path segments, in particular their path length differences, and the positions of the objectives are calibrated and aligned. Detection of the reference specimen using only the microscope objective of the one beam path segment of the double confocal scanning microscope yields an image data set that can be compared to the second image data set that is acquired using the second microscope objective of the second beam path segment of the double confocal scanning microscope. For that purpose, on the one hand the reference specimen is detected using a two-dimensional optical section that is oriented parallel to the focal plane of the respective microscope objectives. By comparing these two data sets, it is possible to align the two microscope objectives with one another in the lateral direction, i.e. transversely to the optical axis. By detecting a two-dimensional optical section that is oriented perpendicular to the planar area configured as the reference specimen, it is possible—assuming corresponding images by the respective microscope objectives are present—to adjust the two microscope objectives to one another in the axial direction, i.e. along the direction of the optical axis. An inclination of the two microscope objectives relative to one another can also be counteracted; for example, unsharply imaged portions of the texture may be regarded as indicating an inclination. By means of the reference specimen it is thus possible on the one hand to calibrate the double confocal scanning microscope beam path prior to the actual specimen detection, and on the other hand to repeat the operation during specimen detection for alignment.

For automatic location and/or focusing of a specimen, provision is made in another method step for the specimen support unit together with the specimen to be moved along the optical axis of the microscope objective or the two microscope objectives, and in that context for the light coming from the planar area configured as the reference specimen to be detected. For example, a specimen support unit that is configured as a specimen slide and comprises a partially reflective surface coating could be placed together with a specimen onto the microscope stage. During an automatic movement of the microscope stage (together with the specimen slide and specimen), the specimen region of the microscope objective is impinged upon confocally with laser light for the reference measurement. This laser light is not used for detection of the specimen, however, and the surface coating of the specimen slide is reflective only for the light that is used for reference specimen detection. This laser light has a wavelength different from that used for specimen detection. As soon as the surface coating of the specimen slide is moved into the vicinity of the focal plane of the microscope objective, a confocal detected signal is measurable. When the detected signal of the reference specimen is maximal, the surface of the specimen slide is in the focal plane of the microscope objective. It is thereby possible, in very particularly advantageous fashion, to find a first reference point rapidly and easily so that location of the specimen is thereby considerably simplified and accelerated.

BRIEF DESCRIPTION OF THE DRAWINGS

There are various ways of advantageously embodying and developing the teaching of the present invention. In conjunction with the explanation of the preferred exemplary embodiments of the invention with reference to the drawings, an explanation is also given of generally preferred embodiments and developments of the teaching. In the drawings:

FIG. 1b schematically depicts the assembled texture using elemental cells of FIG. 1a;

FIG. 2b schematically depicts the assembled texture using elemental cells of FIG. 2a;

FIG. 3b schematically depicts the assembled texture using elemental cells of FIG. 3a;

FIG. 4b schematically depicts the assembled texture using elemental cells of FIG. 4a;

FIG. 5b schematically depicts the assembled texture using elemental cells of FIG. 5a;

FIG. 6b schematically depicts the assembled texture using elemental cells of FIG. 6a;

DETAILED DESCRIPTION OF THE INVENTION

Figure 1A:
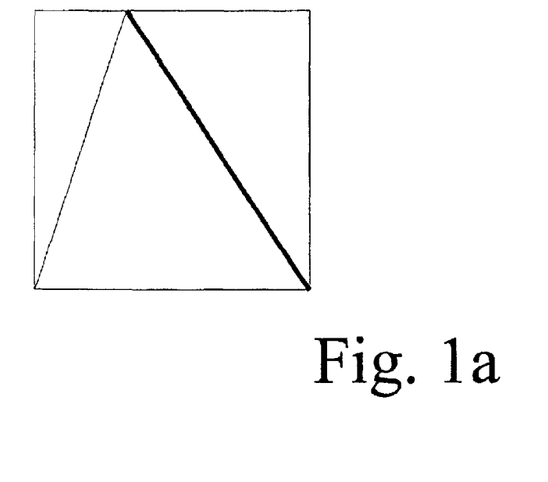
FIG. 1a schematically depicts an elemental cell of a first texture.
Figure 1B:
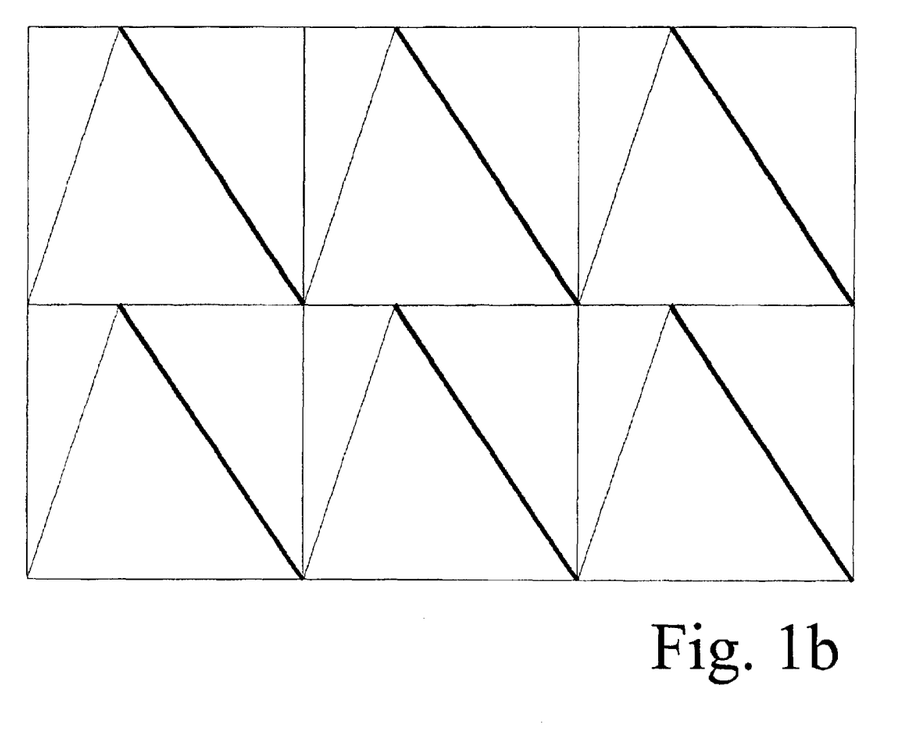
Figure 2A:
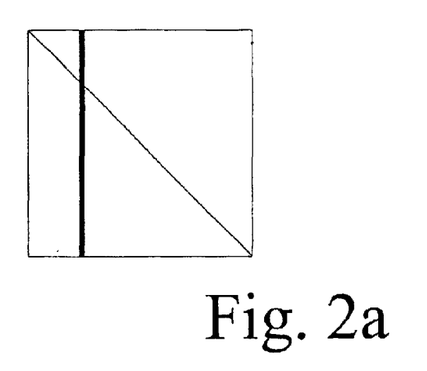
FIG. 2a schematically depicts an elemental cell of a further texture.
Figure 2B:
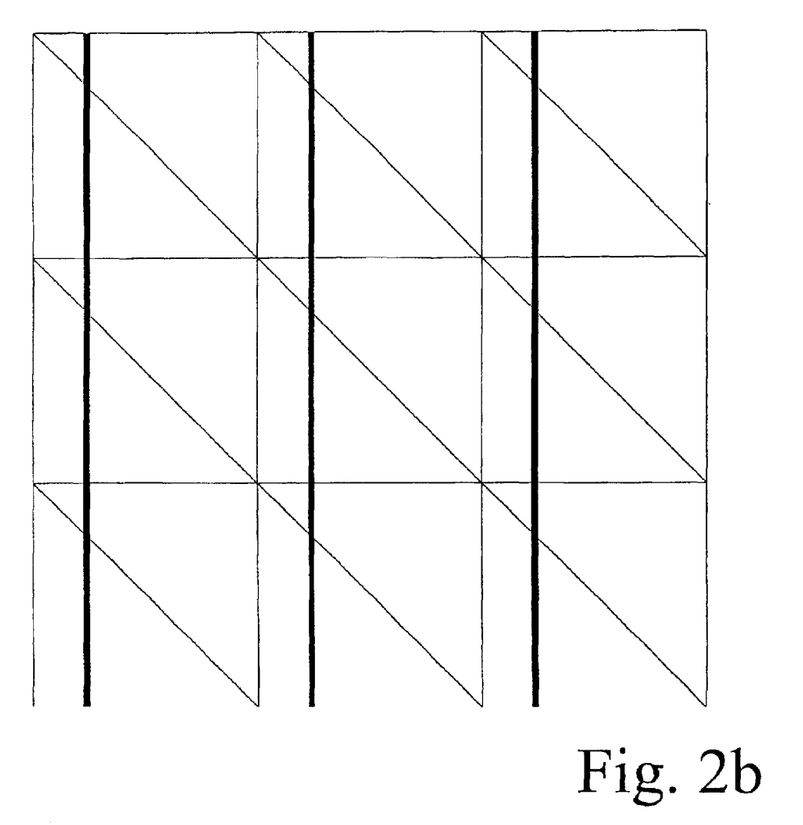
Figure 3A:
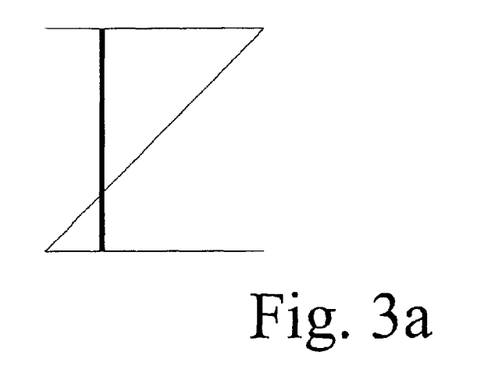
FIG. 3a schematically depicts an elemental cell of a further texture.
Figure 3B:
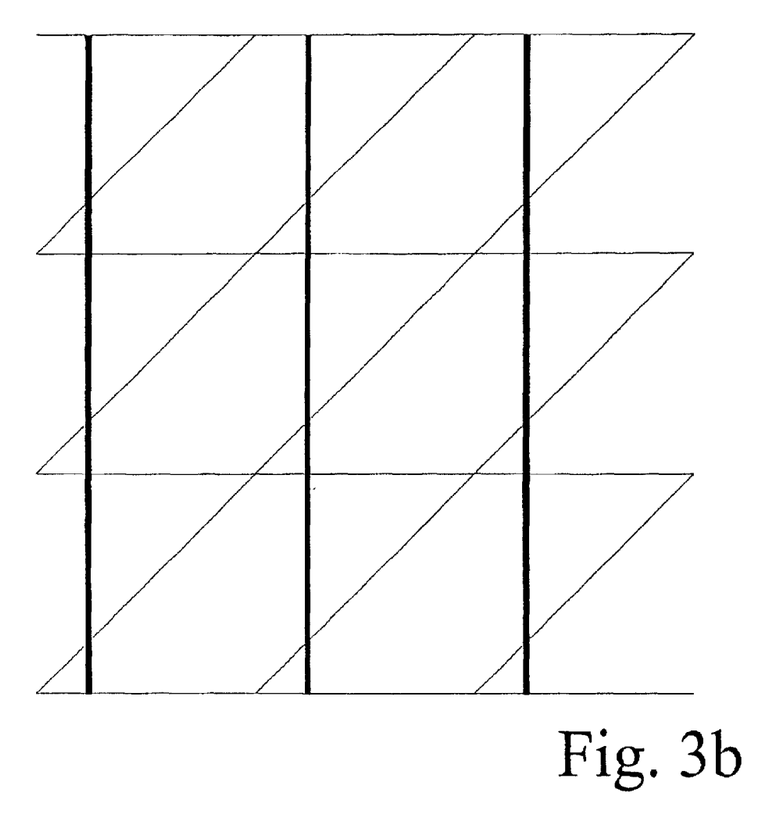

FIGS. 1a, 2a, 3a, 4a, 5a, and 6a all show elemental cells of a texture that are assembled, in FIGS. 1b, 2b, 3b, 4b, 5b, and 6b respectively, into an extended two-dimensional texture. These textures are of known configurations, i.e. the respective lines and respective line widths are in a range of approximately 200 to 400 nm. These textures serve as a reference specimen, these textures being applied onto surfaces of various cover glasses. A cover glass of this kind serves as a specimen support unit. The specimen support unit configured as a cover glass thus possesses a surface configured as a reference specimen. The texture is applied onto the surface in the form of a coating. The coatings of FIGS. 1b, 2b, and 3b are in each case reflective coatings that possess a reflection coefficient of, for example, 0.01 for light of a wavelength region in the near infrared. A suitable laser light source is then, for example, a CW diode laser.

Figure 4A:
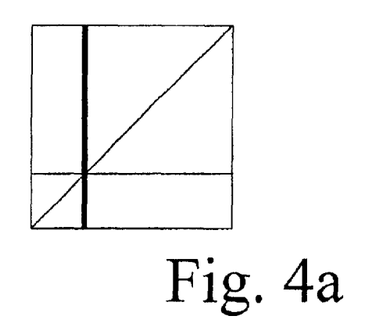
FIG. 4a schematically depicts an elemental cell of a further texture.
Figure 4B:
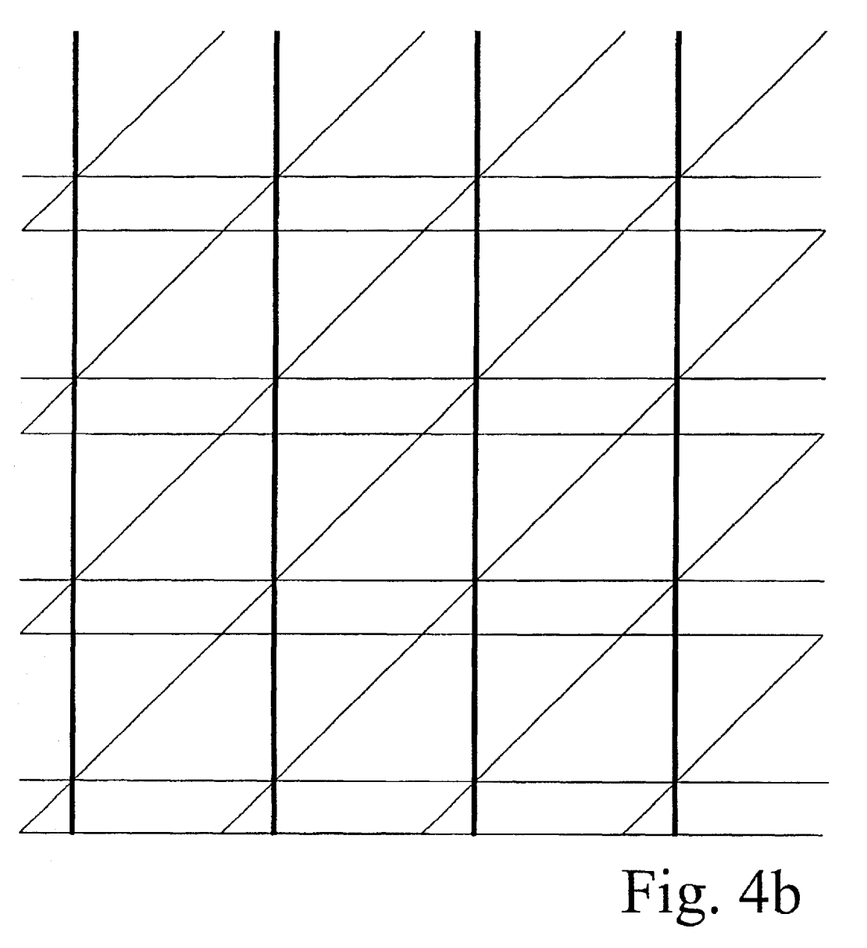
Figure 5A:
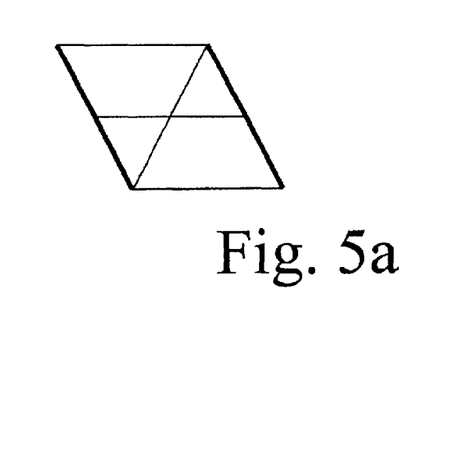
FIG. 5a schematically depicts an elemental cell of a further texture.
Figure 5B:
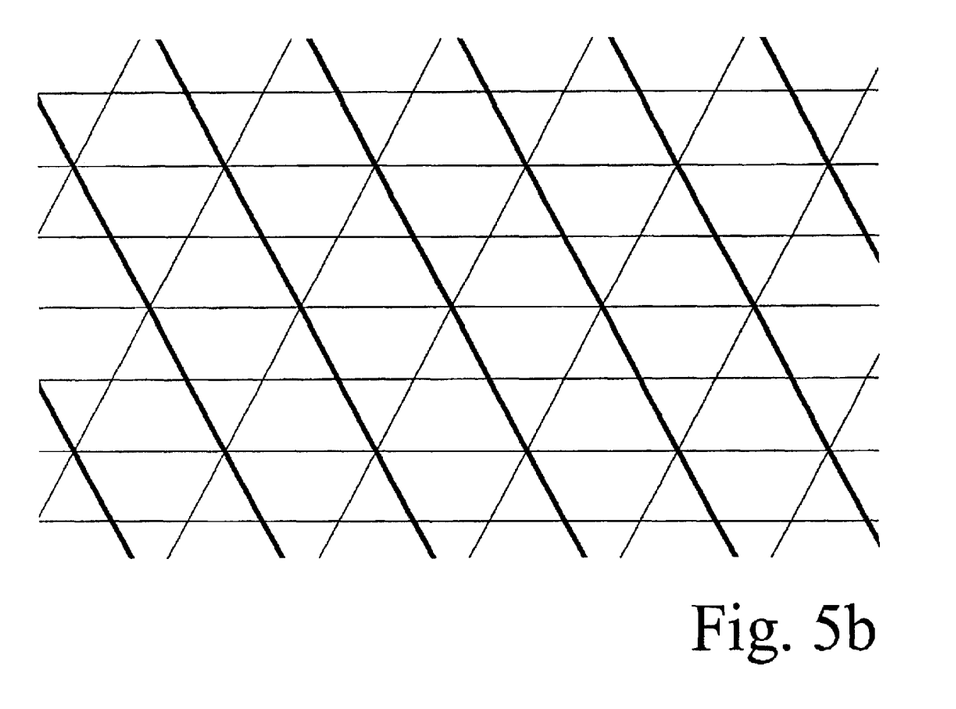
Figure 6A:
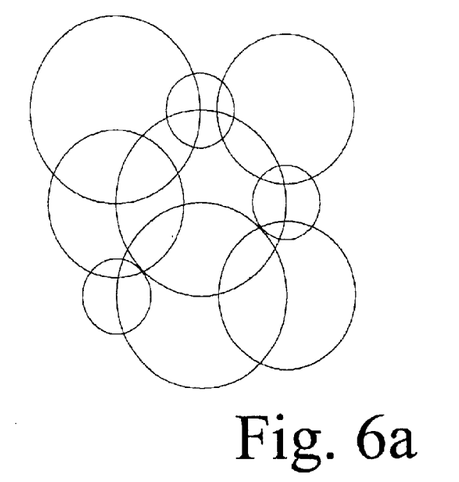
FIG. 6a schematically depicts an elemental cell of a further texture.
Figure 6B:
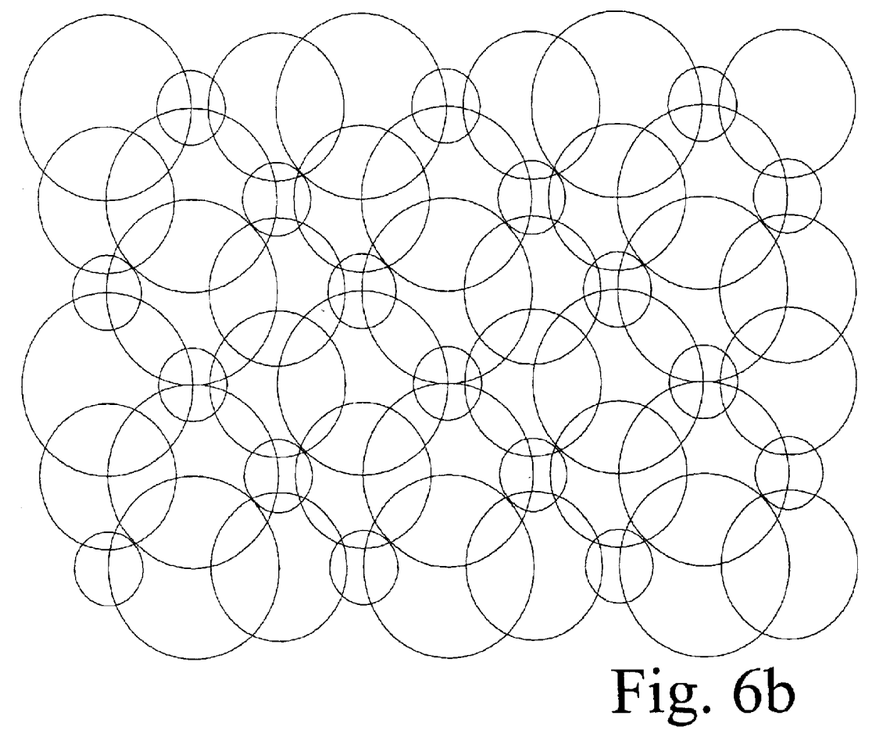

The coatings of FIGS. 4b, 5b, and 6b are of fluorescent configuration; they are in each case fluorescent dyes that can be excited to fluoresce in the visible region, for example with a CW laser.

All the coatings shown in FIGS. 1b, 2b, 3b, 4b, 5b, and 6b are respectively applied onto corresponding cover glasses and arranged in one plane.

Figure 7:
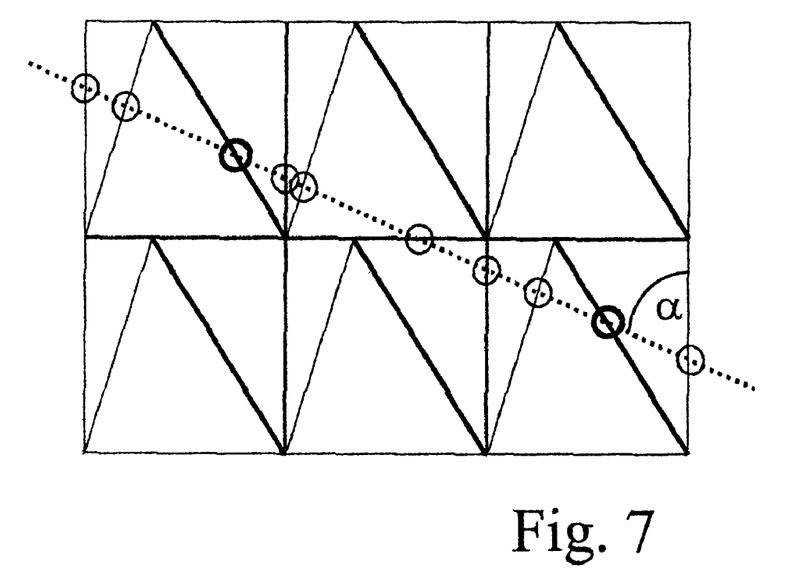
FIG. 7 schematically depicts the assembled texture of FIG. 1, with an indication of a two-dimensional optical section.

FIG. 7 schematically depicts the texture of FIG. 1b that is at least partially detected with a scanning operation of a double confocal scanning microscope. This is a two-dimensional optical section that is arranged perpendicular to the surface of the cover glass equipped with the coating. The perpendicular projection of the optical section onto the surface of the texture in FIG. 7 is accordingly marked as a dashed line.

Figure 8:
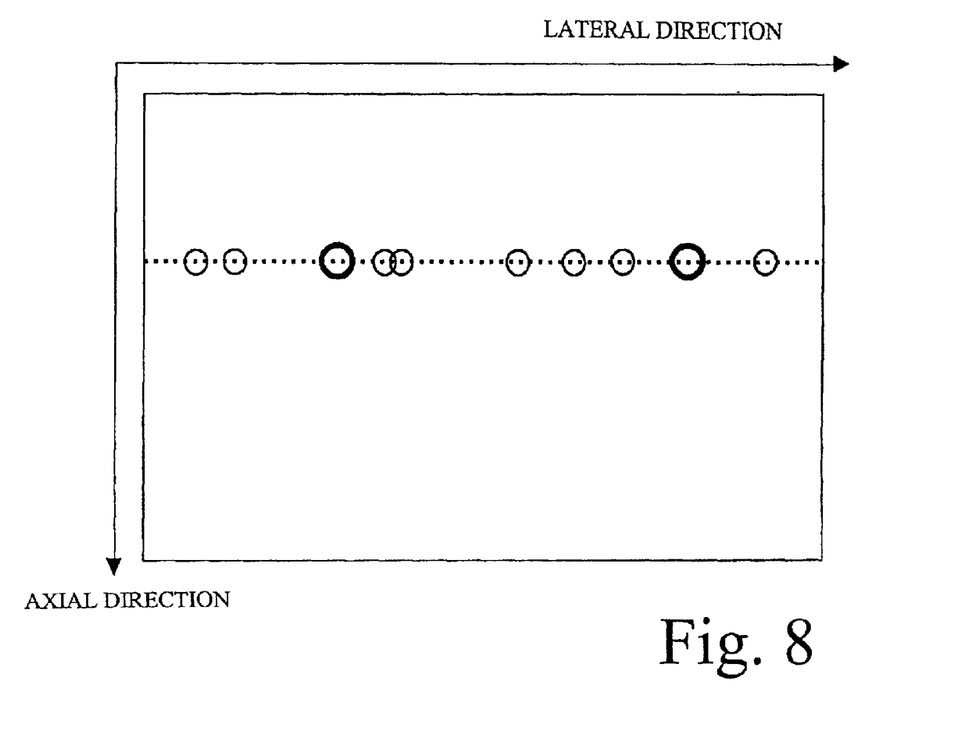
FIG. 8 schematically depicts the two-dimensional optical section that is indicated in FIG. 7.

The two-dimensional optical section of the texture of FIG. 7 is schematically depicted in FIG. 8. Each circle drawn with a thick line shows the intersection point of the two-dimensional optical with a respective thick line of the texture of FIG. 7. The circles drawn with a thin line correspond to the intersection points with the thin lines of FIG. 7. The lateral direction corresponds to the local coordinate along the projection of FIG. 7. The axial direction corresponds to the direction perpendicular to the texture of FIG. 7. It is evident from the depiction of FIG. 8 that a detection signal can be detected from the two-dimensional signal of FIG. 7 only when the surface—and thus the coating of the surface—is located in the focal plane of the microscope objectives.

Figure 9:
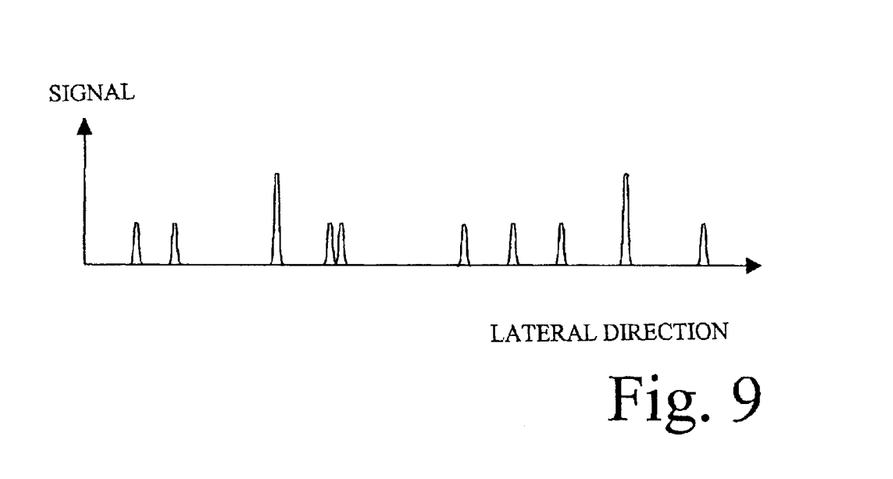
FIG. 9 schematically depicts the intensity distribution measured from FIG. 8.

FIG. 9 shows the detected signal as a function of the lateral position of the projection of FIGS. 7 and 8. The reflection signal of the thick lines of the texture of FIG. 7 results in a higher detection signal, which is evident from the two higher peaks in FIG. 9. The thin lines result in peaks which all have the same intensity.

The image data of the reference specimen are evaluated in computer-assisted fashion. The texture of FIG. 7 serving as reference specimen is of known configuration, i.e., for example, the spacing between lines parallel to one another is known. In addition, the orientation of the two-dimensional optical section implemented by the double confocal scanning microscope is known. Conclusions can therefore be drawn as to the actual lateral orientation of the texture of FIG. 7 relative to the double confocal scanning microscope, since for each intersection angle α of a scanning operation of the scanning microscope, an unequivocal and defined signal pattern, for example corresponding to FIG. 9, is obtained.

In conclusion, be it noted very particularly that the exemplary embodiments discussed above serve merely to describe the teaching claimed, but do not limit it to the exemplary embodiments.

What is claimed is:

1. A method for operating a microscope, comprising the following steps:

providing at least one transparent specimen support unit being associated with a specimen and a reference specimen, the reference specimen including at least one planar area having a defined structure of known configuration, detecting the reference specimen using light microscopy, and calibrating, aligning or adjusting the microscope on the basis of the detection.

2. The method as defined in claim 1, wherein the reference specimen is detected by an image acquisition, thereby making possible an unequivocal association of the position and orientation of the reference specimen.

3. The method as defined in claim 1, wherein the microscope is a confocal scanning microscope.

4. The method as defined in claim 3 wherein the reference specimen is detected by a scanning operation, thereby making possible an unequivocal association of the position and orientation of the defined structure.

5. The method as defined in claim 4 wherein a two-dimensional optical section is performed as the scanning operation and the optical section is oriented perpendicular to the at least one planar area.

6. The method as defined in claim 1, wherein the microscope is a double confocal scanning microscope.

7. The method as defined in claim 6 wherein the reference specimen is detected by a scanning operation, thereby making possible an unequivocal association of the position and orientation of the defined structure.

8. The method as defined in claim 7 wherein a two-dimensional optical section is performed as the scanning operation and the optical section is oriented perpendicular to the at least one planar area.

9. The method as defined in claim 6, wherein on the basis of the detection of the reference specimen, optical beam path segments and the positions of objectives of the microscope are calibrated and aligned.

10. The method as defined in claim 1, wherein image data of the reference specimen are evaluated in computer-assisted fashion.

11. The method as defined in claim 1, wherein on the basis of detected image data of the reference specimen, its position or orientation relative to the detected specimen region are determined.

12. The method as defined in claim 1, wherein by comparing detected image data of the reference specimen to previously detected image data, a drift of the specimen or the specimen support unit are determined.

13. The method as defined in claim 12, wherein the drift of the specimen is compensated for by a corresponding motion of the specimen support unit.

14. The method as defined in claim 12, wherein the drift of the specimen is compensated for using methods of digital image processing.

15. The method as defined in claim 1, wherein for automatic location or focusing of the specimen, the specimen support unit together with the specimen is moved along the optical axis of objective or objectives of the microscope, and in that context the light coming from the at least one planar area is detected.

16. The method as defined in claim 1, wherein on the basis of the detection of the reference specimen, path length differences of optical beam path segments and the positions of objectives of the microscope are calibrated and aligned.

17. The method as defined in claim 1, wherein the at least one planar area includes a texture.

18. The method as defined in claim 17, wherein at least one of the texture and the defined structure of the at least one planar area has an asymmetrical configuration.

19. The method as defined in claim 1, wherein the at least one planar area includes at least one of a coating and a holographic impression.

20. The method as defined in claim 19, wherein the coating is at least one of reflective and luminescent.

* * * * *